June 26, 1956
R. A. REDNER
2,751,930
INTEGRAL FLUID FILTER AND VALVE CONSTRUCTION
Filed Aug. 8, 1952
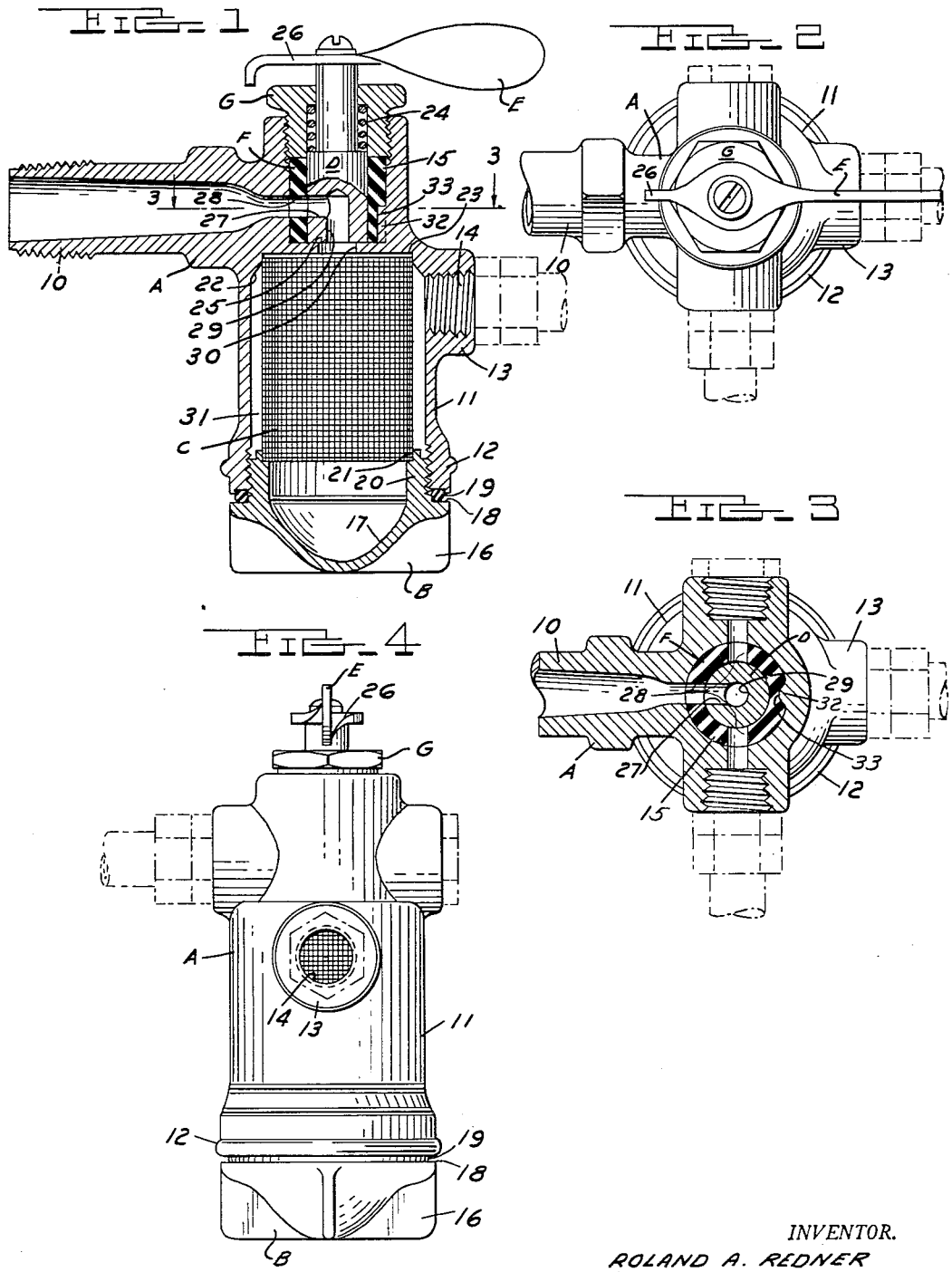
INVENTOR.
ROLAND A. REDNER
BY Farley Forster & Farley
ATTORNEYS

United States Patent Office 2,751,930
Patented June 26, 1956

2,751,930

INTEGRAL FLUID FILTER AND VALVE CONSTRUCTION

Roland A. Redner, Farmington, Mich., assignor to Unifilter Company, Farmington, Mich., a partnership Application August 8, 1952, Serial No. 303,311

2 Claims. (Cl. 137—549)

This invention relates to an integral fluid filter and valve construction.

One object is to provide an integral filter unit, adaptable to service either single or multiple fluid storage units such as fuel oil tanks or drums, incorporating a manually operable valve which may be used for opening or closing the supply flow in the case of a single storage tank or alternately as a selector and shutoff valve in the case of multiple tank installations.

Another object is to provide a liquid filter construction wherein an air path continuously following either a level or upward direction is provided from the outlet port through the filter and valve element to the inlet port(s) completely eliminating the possible development of any air lock or trap within the filter unit and providing a natural air vent to the storage tank whereby the gravity flow of liquid from the storage tank to the consuming unit upon opening the filter valve after installation or initial filling of the tank will be facilitated without requiring either special air vents or bleeding of the lines.

Another object is to provide a novel valve construction for use in performing either selector or shutoff functions.

Another object is to provide a cylindrical filter element having open ends, the lower end of which communicates with a removable dirt and water trap and the upper end with the fluid valve whereby the relatively large, heavy particles of dirt and/or water (as in the case of a fuel oil filter) may settle directly to the trap without clogging the filter while the entire cylindrical area of the filter element is rendered available to filter out the finer suspended particles of dirt from the fluid flowing horizontally through the vertical cylindrical wall of the filter element.

Another object is to provide a filter unit equally applicable to the servicing of either single or multiple storage tanks (for example, one, two or three fuel oil tanks), through the provision of a combination selector and shutoff valve together with optional inlets which may be plugged or connected to auxiliary tanks in accordance with individual requirements.

Another object is to provide a unique valve construction incorporating a simple cylindrical core rotatable to selective inlet positions or to a shutoff position with a cylindrical resilient, deformable, but incompressible bushing interposed between the core and valve body to seal the various inlet passages from each other, from the outside, and from the filter outlet except upon selective registration of a valve core port with one of respective inlets provided through the wall of the bushing.

Another object is to provide an outlet port in axial alignment with the valve core and a right angle inlet port through the cylindrical wall of the core facilitating selection among multiple inlets or shutoff through simple rotation of the core.

These and other objects will be apparent from the following more detailed description of a particular embodiment of my invention and the drawings wherein:

Fig. 1 is a sectional elevation through the entire valve and filter assembly;

Fig. 2 is a plan view showing the three inlets with one of them plugged and a second one connected to an auxiliary tank line;

Fig. 3 is a sectional view along the line 3—3 of Fig. 1; and

Fig. 4 is an end elevation.

With reference to the drawings it will be seen that the main elements of my valve and filter construction include: a main body A, screw cap B, filter element C, cylindrical valve core D, handle E, resilient bushing F, and compression nut G.

The main body A is preferably a die casting incorporating an integral male pipe nipple 10 for direct coupling to the outlet of a fuel oil tank or drum, a depending cylindrical filter housing 11 adapted at the lower end 12 for a threaded connection with the screw cap B and at the side with an outlet boss 13 having female pipe threads 14 located on an axis substantially below the axis of the inlet 10, and a vertical cylindrical bore 15 threaded at the upper end for compression nut G.

The screw cap B is provided with integral ears 16 for convenient manual turning, a substantial interior sediment trap 17, an annular flange 18 for engaging a resilient O-ring type sealing gasket 19, and an annular threaded male portion 20, the upper end of which is provided with an internal cylindrical counterbore 21 forming a seat for the cylindrical filter element C.

The filter element may be of any suitable filter material but is preferably an open ended cylindrical wire cloth element of suitable mesh formed with a diameter providing snug frictional engagement with the seat 21 at its lower end which will permit the filter element to be preassembled with the cap B and inserted in or withdrawn from the filter chamber 11 as a unit with such cap. The upper end of the filter chamber 11 is provided with a tapered wall 22 which will serve to guide the upper end of the filter C into registration with a cylindrical seating surface 23 provided above the tapered section 22, which surface 23 is of a depth sufficient to accommodate some degree of variation in the compression of the sealing ring 19 without buckling the filter element and is of a diameter sufficient to provide contact with the filter element C although preferably with somewhat lighter contact pressure than the lower seat 21 in the screw cap B so that the filter element will be sufficiently free to move with the screw cap B upon its removal for cleaning.

Referring to the valve construction, the resilient sealing bushing F is made of a deformable but incompressible material impervious to the fluid passing therethrough and in the case of fuel oil filters is preferably a synthetic rubber such as Buna N of a high durometer hardness such as 95, Shore "A." The bushing material should be free of air pockets or other compressible inclusions so that the compressive force exerted by the compression nut G will be transmitted substantially uniformly to all contact surfaces and thereby provide an effective seal at all points. A durometer rating of under 85 may not be satisfactorily employed because of the tendency of any softer material to bulge into the port recesses of either the core or outer body resulting in excessive wear and resistance to turning, particularly where the valve is left in one position for a long enough time for the bushing material to acquire a permanent set.

The use of incompressible synthetic rubber of high durometer rating (95 to 100) renders it possible to develop adequate sealing properties, even if used for relatively high pressures in the order of 100 lbs. per square inch, without the necessity of providing metallic or other hard inserts at the bushing ports to avoid the effects of bulging, permanent setting or excessive wear.

The compression nut G of course permits suitable adjustment of sealing pressure exerted by the bushing F against the adjacent walls of the body and valve core, while a spring 24 located within the compression nut urges the valve core D to a properly seated position against the end wall 25 of the valve chamber.

The handle E, including a pointer 26 in alignment with a horizontal port 27 in the side wall of the valve core, serves to rotate the valve core and such port into alignment with any of the corresponding bushing ports 28 for selective opening of flow from any of the three inlet ports provided in the main body B to the vertical core port 29 and the filter, or, when the handle is rotated 180° from the position shown in Fig. 1, to shut off all inlet ports from the filter.

A key 32 cast in the valve housing engages a recess 33 provided in the bushing to locate and retain such bushing against rotating within the housing.

In operation, the pipe nipple 10 is installed in the outlet of one of the fuel tanks while auxiliary tanks may be connected to the other inlet ports by suitable tube fittings while any surplus inlet(s) to the filter may be left plugged as shown in Fig. 2. Fluid passing from any of the filter inlets will flow through a bushing port 28, the aligned horizontal core port 27, the vertical core port 29 through an aperture 30 at the top of the filter chamber within the open end of the filter element C, whereupon any relatively large or heavy particles of dirt and/or moisture will settle directly to the trap 17 provided in the screw cap B without clogging the walls of the filter element C. The annular clearance 31 between the cylindrical filter C and the side walls of the filter chamber 11 will permit fluid passing through any portion of the filter element to flow freely to the outlet port 13. Since only the relatively light, small, suspended particles of dirt come in contact with the filter element, filter cleaning requirements are minimized and, together with the relatively large surface area of the cylindrical element, permit the use of a very fine mesh without introducing any necessity for frequent cleaning.

When the filter is initially installed or after any of the tanks have run dry and been refilled, any air which may be present in the filter or outlet lines connected thereto will have a free continuously rising venting passage from the outlet port 14 or filter chamber up through the valve core and the communicating inlet passages and thence to the fuel tanks themselves, there being no air pockets or traps at any point within the filter or valve construction which might otherwise block or impede gravity flow.

It will be understood that while an embodiment particularly adapted to a fuel oil filter for use with oil burning heating equipment such as oil burners, space heaters, water heaters, and the like, has been disclosed in detail, the novel features of my construction might readily be adapted to provide selective flow, shutoff and/or filtering of fluids for other uses and that numerous modifications in details of construction might be resorted to without departing from the scope of my invention as defined in the appended claims.

I claim:

1. An integral fluid filter and valve construction comprising an integral valve and filter body having superimposed concentric filter and valve chambers of cylindrical contour and separated by an apertured interior divider wall; an inherently resilient, incompressible valve sleeve insert fixedly disposed in said valve chamber and bottomed against said wall; said body having a plurality of inlet ports communicating with the valve chamber through a plurality of corresponding and aligned ports formed in said valve sleeve insert, and said body also having an outlet port communicating only with said filter chamber and generally beneath said inlet ports; compression means urging said sleeve insert against said wall in a fluid tight sealing relation therewith; a cylindrical rotatable valve core concentric with said valve chamber and telescoped within said sleeve insert in fluid tight peripheral contact therewith, said valve core having a passage therethrough for establishing communication between a selected one of said ports and the filter chamber; a tubular, open-ended filter screen disposed in said filter chamber to receive through one open end thereof the discharge from said valve core, said screen being interposed between said valve chamber and said outlet port; and a closure cap for said filter chamber closing the other end of said filter screen and having a central trap chamber underlying said filter chamber in communication with the interior of said filter screen to accommodate the removal of filtered particles therefrom.

2. An integral fluid filter and valve construction comprising a valve and filter body open at either end and having superimposed concentric cylindrical filter and valve chambers separated by an interior axially apertured divider wall; an inherently resilient, incompressible valve sleeve insert fixedly disposed in said valve chamber and bottomed against said wall; a valve stem projecting through the open end of said valve chamber and having a core portion snugly and telescopically received by said insert; a compression nut surrounding a portion of the valve stem to close the open end of the valve chamber and bearing against the valve insert to urge the same against said divider wall; said valve insert having a plurality of ports for communication with corresponding ports formed in the body and said valve stem core portion having a passage therethrough for establishing communication between a selected one of the insert ports and the wall aperture; a closure cap for the open lower end of said filter chamber having a central trap recess formed therein; an open-ended tubular filter screen interposed between said wall and said cap to be retained in the filter chamber for receiving axially thereinto discharge from the valve stem core passage through the wall aperture; said body having an outlet port communicating with the filter chamber exteriorly of said filter screen and intermediate said wall and said closure cap.

References Cited in the file of this patent

UNITED STATES PATENTS

| | | |
|---|---|---|
| 218,739 | Hess | Aug. 19, 1879 |
| 262,935 | Dibble | Aug. 22, 1882 |
| 417,761 | Wallwork | Dec. 24, 1889 |
| 1,204,108 | Woodard | Nov. 7, 1916 |
| 1,214,747 | Betker | Feb. 6, 1917 |
| 1,507,806 | Zeller | Sept. 9, 1924 |
| 1,526,991 | Lambert | Feb. 17, 1925 |
| 1,617,048 | Gregory | Feb. 8, 1927 |
| 1,657,173 | Morrison | June 24, 1928 |
| 1,965,054 | Powers | June 3, 1934 |
| 1,992,212 | Horne | Feb. 26, 1935 |
| 2,001,610 | Hildenbrand | May 14, 1935 |
| 2,017,350 | Morgan | Oct. 15, 1935 |
| 2,063,699 | Schellin | Dec. 8, 1936 |
| 2,198,386 | Hiester | Apr. 23, 1940 |
| 2,301,976 | Schellens | Nov. 17, 1942 |
| 2,424,210 | Sutton | July 15, 1947 |

FOREIGN PATENTS

| | | |
|---|---|---|
| 475,316 | Canada | July 17, 1951 |
| 503,657 | Germany | July 24, 1930 |